US009805689B2

(12) United States Patent
Park

(10) Patent No.: US 9,805,689 B2
(45) Date of Patent: Oct. 31, 2017

(54) APPARATUS AND METHOD FOR EASY DIAGNOSIS, REPAIR, AND MAINTENANCE OF A COMMERCIAL DISPLAY SCREEN

(75) Inventor: Jong Hyuk Park, Fremont, CA (US)

(73) Assignee: GPO US, Inc., Livermore, CA (US)

( * ) Notice: Subject to any disclaimer, the term of this patent is extended or adjusted under 35 U.S.C. 154(b) by 1720 days.

(21) Appl. No.: 13/307,011

(22) Filed: Nov. 30, 2011

(65) Prior Publication Data

US 2013/0134987 A1    May 30, 2013

(51) Int. Cl.
*G09G 5/00* (2006.01)
*G06F 1/16* (2006.01)

(52) U.S. Cl.
CPC ........... *G09G 5/006* (2013.01); *G06F 1/1601* (2013.01); *G09G 2330/12* (2013.01); *Y10T 29/49004* (2015.01)

(58) Field of Classification Search
CPC ...... G09G 5/006; G09G 3/2096; G09G 3/006; G09G 2330/12; Y10T 29/49004; G06F 1/1601
See application file for complete search history.

(56) References Cited

U.S. PATENT DOCUMENTS

| | | | | |
|---|---|---|---|---|
| 5,389,952 A * | 2/1995 | Kikinis | ............. | G03G 15/5075 345/212 |
| 5,566,339 A * | 10/1996 | Perholtz | .................... | G06F 1/26 379/38 |
| 6,878,272 B2 * | 4/2005 | Kawaguchi | ............. | A61M 1/14 210/109 |
| 7,064,672 B2 * | 6/2006 | Gothard | .................... | G06F 1/16 312/223.2 |
| 2005/0037658 A1 * | 2/2005 | Mayer | ..................... | G06F 1/184 439/374 |
| 2006/0192927 A1 * | 8/2006 | Ikeuchi | ............. | G02F 1/133308 353/119 |
| 2007/0162796 A1 * | 7/2007 | Chan | .................. | G01R 31/2834 714/724 |
| 2007/0241990 A1 * | 10/2007 | Smith | .................... | G09G 5/003 345/5 |
| 2008/0062663 A1 * | 3/2008 | Tsuo | ..................... | G06F 1/1601 361/752 |

(Continued)

*Primary Examiner* — Huy Q Phan
*Assistant Examiner* — Dustin Dickinson
(74) *Attorney, Agent, or Firm* — Invent Capture, LLC.; Samuel S. Cho

(57) ABSTRACT

One or more apparatuses and methods for enabling easy diagnosis, repair, and maintenance of a commercial display screen are disclosed. In one embodiment of the invention, this apparatus includes a removable commercial display kit box, a corresponding base plate interface unit attached to a rear panel of the commercial display screen, and a guiding mechanism for docking the removable commercial display kit box and the corresponding base plate interface unit. Furthermore, in one embodiment of the invention, the removable display kit box contains an analog-to-digital converter board, a power board, automatic-switching dual data ports, maintenance check visual indicators, and a removable fuse inlet. In case of a commercial display screen malfunction, the removable display kit box allows a quick inspection and a modular repair or replacement of a malfunctioning part, without requiring the entire commercial display screen to be dismounted from a wall or another attached structure.

7 Claims, 8 Drawing Sheets

(56) References Cited

U.S. PATENT DOCUMENTS

2008/0186664 A1* 8/2008 Chang ............... H05K 7/20963
361/679.01
2009/0184221 A1* 7/2009 Sculler .................. F16M 13/02
248/221.11

* cited by examiner

APPARATUS AND METHOD FOR EASY DIAGNOSIS, REPAIR, AND MAINTENANCE OF A COMMERCIAL DISPLAY SCREEN

BACKGROUND OF THE INVENTION

The present invention generally relates to display screens. More specifically, various embodiments of the present invention relate to one or more apparatuses and methods for easy diagnosis, repair, and maintenance of an electronic commercial display screen.

Electronic commercial display screens have been commonly deployed for indoor or outdoor advertisements and information displays in buildings, stadiums, and commercial signage structures. Unlike static (e.g. paper-based) commercial signage, electronic commercial display screens can display dynamically-changing information and readily update display contents using a computer or another electronic medium locally or remotely connected to the electronic commercial display screens.

Most of today's electronic commercial display screens are based on liquid crystal display (LCD) panels, plasma display panels, or light-emitting diode (LED) displays. Typically, LCD's and plasma display panels are used for indoor commercial display applications, while LED displays are used for large outdoor electronic boards or signage. In case of LCD or plasma display-based commercial display screens, if a desirable effective display area is larger than the size of an individual panel, it is a common practice to juxtapose multiple number of panels to enable a big display screen, which comprises a plurality of display panels with linked and/or synchronized video data coordinating the plurality of display panels.

Regardless of a particular display screen technology (e.g. LCD, plasma, LED, and etc.) used for a commercial display screen, it is common for the commercial display screen to malfunction during its display operation. Any operational downtime resulting from a malfunction of a commercial display screen is undesirable, as the operational downtime translates to lost opportunity to convey commercial information or other intended visual information to viewers near the commercial display screen.

In order to minimize opportunity costs related to a malfunctioning commercial display screen, certain businesses prefer a commercial display system operator to repair a malfunctioning commercial display screen in a few hours from the initial reporting of the malfunction. In many cases, such an urgent repair preference cannot be satisfied, as it may take a few hours to diagnose and identify the causes of a malfunction, let alone to repair a malfunctioning display screen. Furthermore, most diagnosis, inspections, and repairs of a commercial display screen typically require a maintenance worker to dismount the entire commercial display screen from a wall or another building structure, which is time-consuming, unsightly, and even dangerous.

Therefore, it may be desirable to devise an apparatus which enables easy diagnosis, repair, and maintenance of a commercial display screen. In addition, it may be desirable to devise a related method for easy diagnosis, repair, and maintenance of a commercial display screen. Furthermore, it may also be beneficial to incorporate a novel device architecture which provides a high level of resilience against an operational failure of a commercial display screen.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, an apparatus for easy diagnosis, repair, and maintenance of a commercial display screen is disclosed. This apparatus comprises: a removable commercial display kit box with electrical contact pin-outs configured to be docked into a corresponding base plate interface, wherein the removable commercial display kit box contains at least some electrical components prone to malfunction, wear-outs, and/or breakdowns; the corresponding base plate interface operatively connected to power inverters and low-voltage differential signaling (LVDS) system in the commercial display screen, wherein a docking between the corresponding base plate interface and the electrical contact pint-outs from the removable commercial display kit box provides docked electrical connections among the power inverters, the LVDS system, and some electrical components inside the removable commercial display kit box; and one or more locking safety pins configured to provide a securely attached position between the removable commercial display kit box and the corresponding base plate interface.

In another embodiment of the invention, a method of using an apparatus for easy diagnosis, repair, and maintenance of a commercial display screen is disclosed. This method comprises the steps of: inspecting maintenance visual check indicators from an existing mounted position of the commercial display screen; and if the maintenance visual check indicators suggest a hands-on repair or a hands-on inspection of a removable commercial display kit box attached to the commercial display screen: unlocking and/or unscrewing locking safety pins which securely hold the removable commercial display kit box; making necessary inspection, replacement, and/or repair associated with the removable commercial display kit box; and sliding-in the inspected and/or repaired removable commercial display kit box, or alternatively, sliding-in a new removable commercial display kit box; else if the maintenance visual check indicators do not suggest that the hands-on repair or the hands-on inspection of the removable commercial display kit box resolves a malfunction of the commercial display screen: resetting the commercial display screen, dismounting the commercial display screen for repair outside of contents of the removable display kit box, or taking another repair measure.

DETAILED DESCRIPTION

Figure 1:
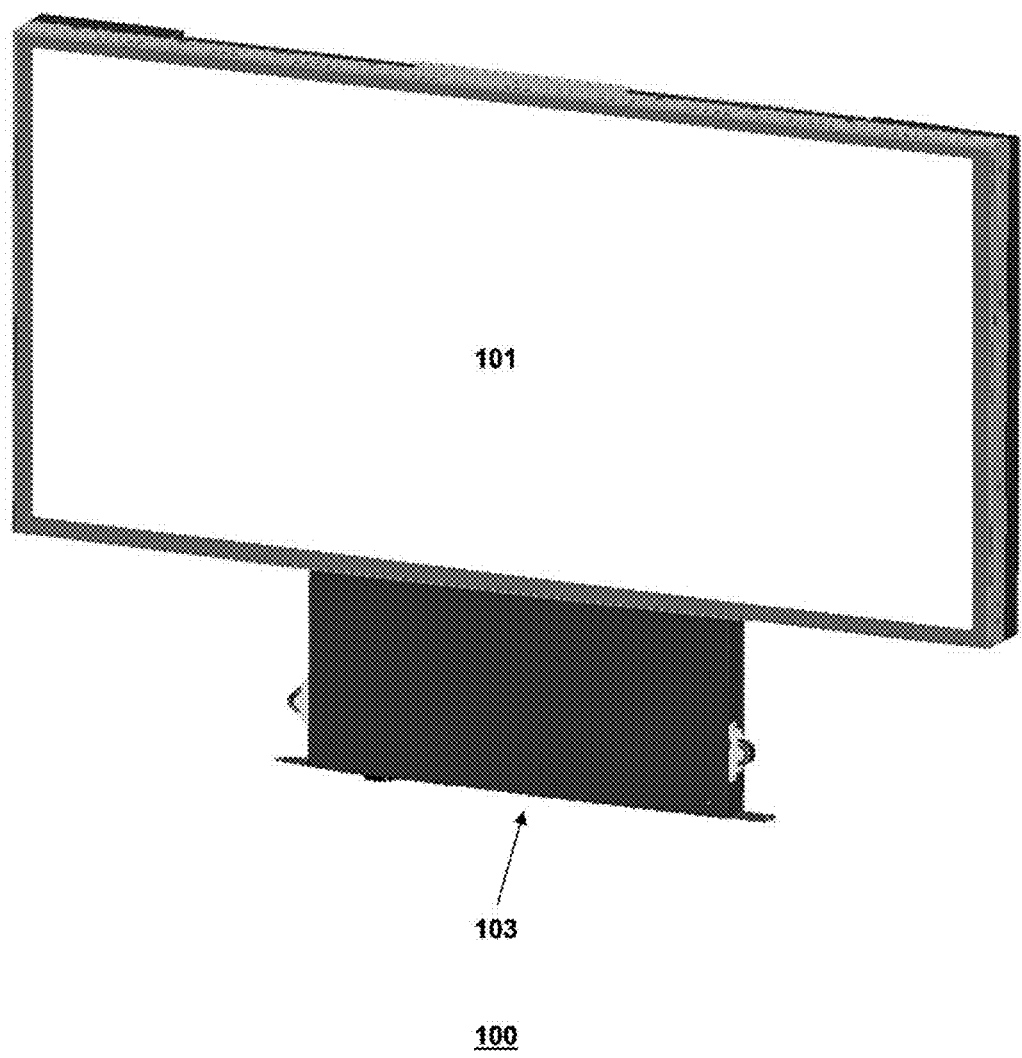
FIG. 1 shows a front panel view of a commercial display screen, which incorporates a removable commercial display kit box, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more apparatuses and methods for easy diagnosis, repair, and maintenance of a commercial display screen. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, any orders of blocks in process flowcharts or diagrams representing one or more embodiments of the invention do not inherently indicate any particular order nor imply any limitations in the invention.

For the purpose of describing the invention, a term "commercial display screen" is defined as an electronic display screen such as a liquid crystal display (LCD), a plasma display, an light emitting diode (LED)-based display, or another electronic display screen configured to display information according to locally-stored display data (i.e. in a local data storage such as a memory unit, a hard disk drive, and etc.) or remotely-received display data from a data network (i.e. such as the Internet, a corporate Intranet, a local area network (LAN), and/or etc.). Typically, a commercial display screen depicts graphical or textual information intended for multiple viewers in a commercial or business environment, wherein the multiple viewers may be customers, potential customers, or employees located near the commercial display screen.

Furthermore, for the purpose of describing the invention, a term "removable commercial display kit box" is defined as a detachable and modular electronic component container, which contains at least some electronic components that are prone to malfunction, wear-outs, and/or breakdowns. In a preferred embodiment of the invention, the removable commercial display kit box has electrical pin-out contacts, which are configured to dock into a corresponding base plate interface for operation of a commercial display screen. Furthermore, in the preferred embodiment of the invention, the removable commercial display kit box contains an analog-to-digital (A/D) converter board and a power supply and/or management board.

In addition, for the purpose of describing the invention, a term "corresponding base plate interface" is defined as a matching electrical contact interface on a base plate of a commercial display screen, wherein the matching electrical contact interface is configured to contact the electrical pin-out contacts from a removable commercial display kit box.

Furthermore, for the purpose of describing the invention, a term "guiding mechanism" is defined as a device that guides a removable commercial display kit box to a corresponding base plate interface for a correct alignment of electrical contacts between the removable commercial display kit box and the corresponding base plate interface. Examples of a guiding mechanism include, but are not limited to, a precision sliding track system using guide rails, guiding indentations on a surface (e.g. a rear-panel base plate) of a commercial display screen, or guiding alignment markers on a surface of a commercial display screen.

In addition, for the purpose of describing the invention, a term "automatic-switching dual data port design" is defined as a novel electronic architecture which allows fail-safe automatic switch-over from a first multimedia data input port to a second multimedia data input port in case a malfunction or no signal from the first multimedia data input port, as disclosed in one or more embodiments of the invention. In a preferred embodiment of the invention, dual Digital Visual Interface (DVI) input ports are used for the automatic-switching dual data port design.

One aspect of an embodiment of the present invention is providing an apparatus for easy diagnosis, repair, and maintenance of a commercial display screen. In a preferred embodiment of the invention, this apparatus comprises a removable commercial display kit box and a corresponding base plate interface on a rear panel of a commercial display screen.

Another aspect of an embodiment of the present invention is providing a method that enables easy diagnosis, repair, and maintenance of a commercial display screen.

Yet another aspect of an embodiment of the present invention is incorporating a novel device architecture which provides a high level of resilience against the operational failure of a commercial display screen. In a preferred embodiment of the invention, this novel device architecture includes an automatic-switching dual data port design. Furthermore, the novel device architecture may additionally include a USB port-based control of a serial interface (e.g. RS-232) for remote status check and control of a commercial display screen.

FIG. 1 shows a front panel view of a commercial display screen (100), which incorporates a removable commercial display kit box (103), in accordance with an embodiment of the invention. In a preferred embodiment of the invention, the commercial display screen (100) is a liquid crystal display (LCD)-based unit, which comprises an LCD panel (e.g. 101) and a plurality of electronic components designed for the LCD panel, wherein at least some electronic components prone to malfunction, wear-outs, and/or breakdowns are located within the removable commercial display kit box (103). In the preferred embodiment of the invention, the removable commercial display kit box (103) includes a power board which supplies and regulates power to a backlighting assembly and the LCD panel, and an analog-to-digital converter (A/D) board which can monitor power output levels to various components associated with the commercial display screen (100). In addition, the commercial display kit box (103) may also include automatic-switching dual data ports, maintenance check visual indicators, and a removable fuse inlet.

In another embodiment of the invention, the commercial display screen (100) is a plasma display-based unit, which comprises a plasma display panel (e.g. 101) and a plurality of electronic components designed for the plasma display-based unit. In case of the plasma display-based unit, the removable commercial display kit box (103) for the plasma display-based unit also includes at least some electronic components prone to malfunction, wear-outs, and/or breakdowns. Yet in another embodiment of the invention, the commercial display screen (100) is a light-emitting diode (LED) display-based unit, which comprises an array of LED's to form a display area (e.g. 101) and a plurality of electronic components designed for the LED display-based unit. In case of the LED display-based unit, the removable commercial display kit box (103) for the LED display-based unit also includes at least some electronic components prone to malfunction, wear-outs, and/or breakdowns.

As shown in FIG. 1, regardless of underlying display technology used (e.g. LCD, plasma, LED arrays, and etc.) in one or more embodiments of the invention, the removable commercial display kit box (103) is configured to dock into or detached from a corresponding base plate interface (e.g. 217 of FIG. 2) for easy and modular diagnosis, repair, and maintenance of the commercial display screen. In a preferred embodiment of the invention, the removable commercial display kit box (103) utilizes a precision sliding track system using guide rails (e.g. 221, 223 of FIG. 2) to align electrical contacts correctly during a slide-in docking procedure of the removable commercial display kit box (103) with the corresponding base plate interface (e.g. 217 of FIG. 2).

Figure 2:
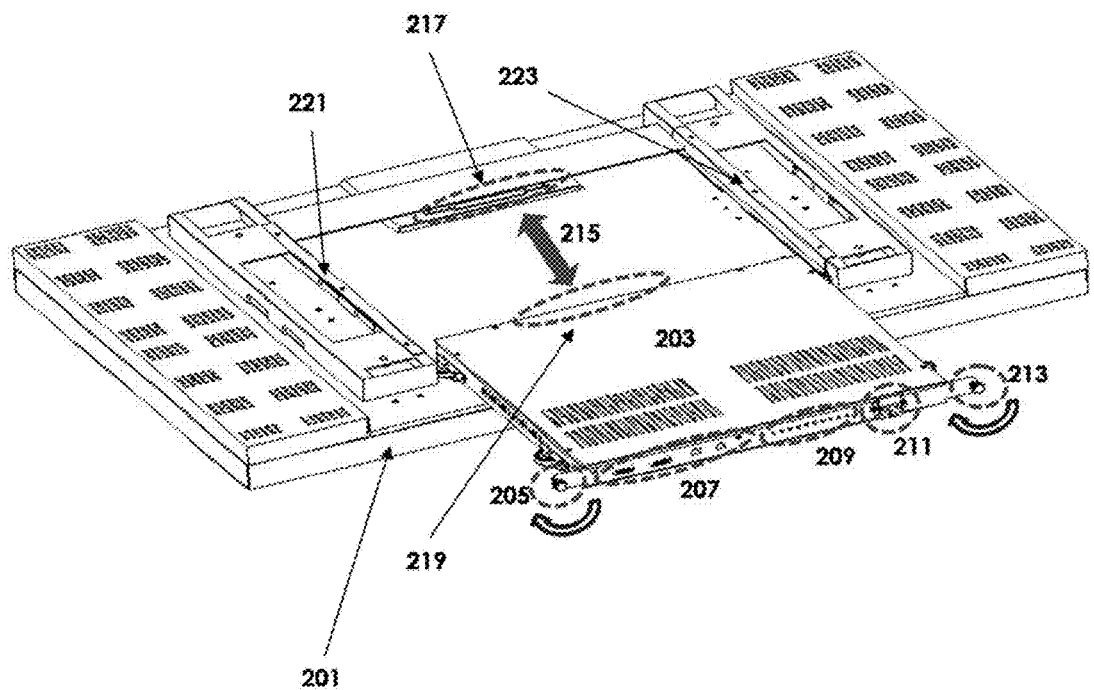
FIG. 2 shows a rear panel of a commercial display screen, which is separated from a removable commercial display kit box, in accordance with an embodiment of the invention.

FIG. 2 shows a rear panel (201) of a commercial display screen (200), which is separated from a removable commercial display kit box (203), in accordance with an embodiment of the invention. In a preferred embodiment of the invention, the removable commercial display kit box (203) contains at least some electronic components, which are prone to malfunction, wear-outs, and/or breakdowns during the operation of the commercial display screen (200). For example, in the preferred embodiment of the invention, the removable commercial display kit box (203) contains a power board which supplies and regulates power to various components of the commercial display screen (200), and an analog-to-digital converter (A/D) board which can monitor power output levels to various components associated with the commercial display screen (200).

Furthermore, as shown in FIG. 2, in a preferred embodiment of the invention, the commercial display kit box (203) may also include data ports (207) (e.g. automatic-switching dual data ports, USB ports, and etc.), maintenance check visual indicators (209), a removable fuse inlet (211) containing a replaceable electrical fuse, and one or more locking safety pins or screws (e.g. 205, 213) to securely position the removable commercial display kit box (203) after its electrical contact pin-outs (219) are aligned and docked into a corresponding base plate interface (217). Moreover, in the preferred embodiment of the invention, the removable commercial display kit box (203) is configured to dock into or detached from the corresponding base plate interface (217) for easy and modular diagnosis, repair, and maintenance of the commercial display screen.

In the preferred embodiment of the invention, the corresponding base interface (217) is also operatively connected to display drivers, power inverters, and an LVDS (low-voltage differential signaling) system, which may be located outside of the removable commercial display kit box (203). In many situations, the use of the corresponding base plate interface (217) and standardized electrical contact pin-outs (219) on the removable commercial display kit box (203) eliminates the need to disconnect or re-connect LVDS and power inverter-related electrical connections individually, which is a cumbersome and time-consuming process in conventional repair operations.

As shown in FIG. 2, in one embodiment of the invention, by utilizing a precision sliding track system comprising a first guide rail (221) and a second guide rail (223), side edges of the removable commercial display kit box (203) can slide through (i.e. 215) the first guide rail (221) and the second guide rail (223) and correctly align the electrical contact pin-outs (219) with the corresponding base plate interface (217) for a precision docking of the removable commercial display kit box (203). Optionally, the removable commercial display kit box (203) may use one or more rollers on each side edge to enable sliding of the removable commercial display kit box (203) easier through one or more guide rails (e.g. 221, 223) of the precision sliding track system. Furthermore, in one embodiment of the invention, a separate set of rails can be attached to one or more side edges of the removable commercial display kit box (203), wherein the separate set of rails is configured to fit inside the one or more guide rails (e.g. 221, 223), which are operatively attached on the rear panel (201). Moreover, the precision sliding track system as shown in FIG. 2 may also incorporate a slide stopper mechanism, which can prevent the removable commercial display kit box (203) from falling off at the bottom edges of the one or more guide rails (e.g. 221, 223) during a kit box detachment process.

In another embodiment of the invention, another method of alignment or another guiding system may be used instead of the precision sliding track system comprising one or more guide rails. Examples of alternative alignment and guiding systems may include, but are not limited to, guiding indentations or alignment markers on a surface (e.g. a rear-panel base plate) of a commercial display screen.

Continuing with FIG. 2, in a preferred embodiment of the invention, the maintenance check visual indicators (209) comprise a plurality of LED lights, each of which representing an operational status of a particular feature of the commercial display screen (200). In the preferred embodiment of the invention, it may be desirable to place the maintenance check visual indicators (209) at a bottom edge surface of the removable commercial display kit box (203) for a quick and easy visual inspection by a maintenance technician, because a typical commercial display screen is mounted above the human eyelevel. In some cases, the quick visual inspection alone may identify the problem for a commercial display screen and may not even require removing the removable commercial display kit box (203), let alone dismounting the entire commercial display screen unit. In other cases, the quick visual inspection of the maintenance check visual indicators (209) may indicate what parts need to be replaced or repaired while the removable commercial display kit box (203) is still operationally attached to the corresponding base plate interface (217), and the maintenance technician then can simply take down the removable commercial display kit box (203) to proceed with repair or replacement of parts contained in the removable commercial display kit box (203).

As shown by FIG. 2 and as described above, the concept of a cartridge-style module, as embodied by a removable commercial display kit box (e.g. 203) in various embodiments of the present invention, is novel and advantageous for maintenance or repair operation of a commercial display screen. By placing failure-prone electronic components such as a power board, an analog-to-digital converter board, and a replaceable electrical fuse (for protection against power surge and ESD) in a removable module (i.e. a removable commercial display kit box (203)), various embodiments of the present invention enable a quick and easy inspection, repair, and maintenance of a commercial display screen, while avoiding a time-consuming and cumbersome dismounting of the entire commercial display screen unit from an installed position. Furthermore, the maintenance check visual indicators (209) on a visible surface of the removable commercial display kit box (203) provide an additional convenience of quick function or malfunction check via one or more indicator lights on the maintenance check visual indicators (209), even before deciding to detach the removable commercial display kit box (203) from the corresponding base plate interface (217) of a commercial display screen (200).

Figure 3:
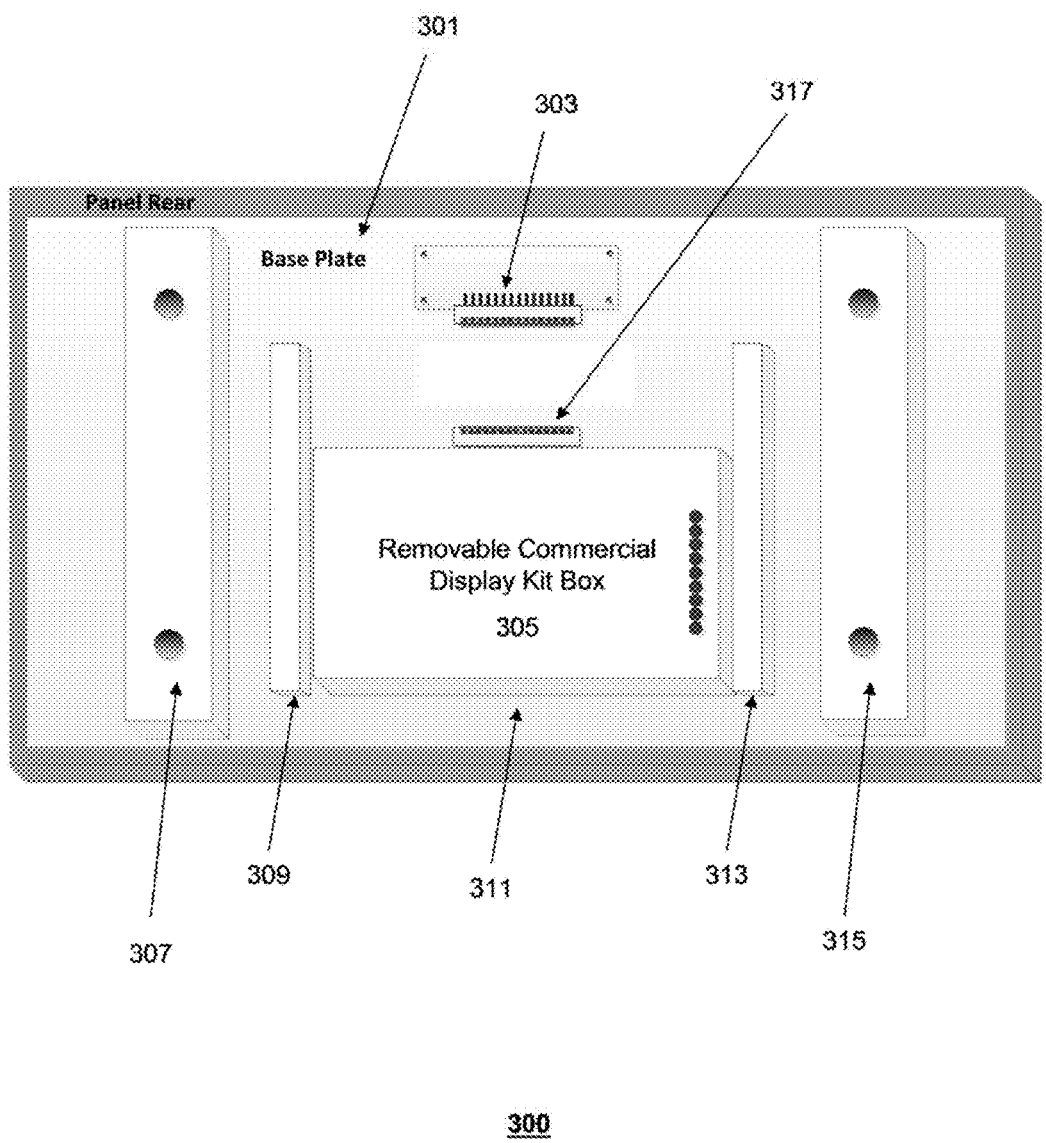
FIG. 3 shows another rear panel of a commercial display screen, which is separated from a removable commercial display kit box, in accordance with an embodiment of the invention.

FIG. 3 shows another rear panel of a commercial display screen (300), which is separated from a removable commercial display kit box (305), in accordance with an embodiment of the invention. In a preferred embodiment of the invention, the removable commercial display kit box (305) contains at least some electronic components, which are prone to malfunction, wear-outs, and/or breakdowns during the operation of the commercial display screen (300). For example, in the preferred embodiment of the invention, the removable commercial display kit box (305) contains a power board which supplies and regulates power to various components of the commercial display screen (300), and an analog-to-digital converter board which can monitor power output levels to various components associated with the commercial display screen (300). In addition, the commercial display kit box (305) may also include data ports (e.g. automatic-switching dual data ports, USB ports, and etc.), maintenance check visual indicators, a removable fuse inlet containing a replaceable electrical fuse, and one or more locking safety pins or screws to securely position the removable commercial display kit box (305) after its electrical contact pin-outs (317) are aligned and docked into a corresponding base plate interface (303).

In the preferred embodiment of the invention, the corresponding base interface (303) is also operatively connected to display drivers, power inverters, and an LVDS (low-voltage differential signaling) system, which may be located outside of the removable commercial display kit box (305). In many situations, the use of the corresponding base plate interface (303) and standardized electrical contact pin-outs (317) on the removable commercial display kit box (305) eliminates the need to disconnect or re-connect LVDS and power inverter-related electrical connections individually, which is a cumbersome and time-consuming process in conventional repair operations.

Furthermore, in the preferred embodiment of the invention, the removable commercial display kit box (305) is configured to dock into or detached from the corresponding base plate interface (303) on a rear panel base plate (301) for easy and modular diagnosis, repair, and maintenance of the commercial display screen. In addition, a precision sliding track system comprising a first guide rail (309) and a second guide rail (313) may be attached to the rear panel base plate (301), wherein side edges of the removable commercial display kit box (305) are configured to slide through the first guide rail (309) and the second guide rail (313) and correctly align the electrical contact pin-outs (317) with the corresponding base plate interface (303) for a precision docking of the removable commercial display kit box (305). Optionally, the removable commercial display kit box (305) may use one or more rollers on each side edge to enable sliding of the removable commercial display kit box (305) easier through one or more guide rails (e.g. 309, 313) of the precision sliding track system. In another embodiment of the invention, another method of alignment or another guiding system may be used instead of the precision sliding track system comprising one or more guide rails. Examples of alternative alignment and guiding systems may include, but are not limited to, guiding indentations or alignment markers on a rear-panel base plate (e.g. 301) of a commercial display screen.

In a preferred embodiment of the invention, a bottom surface (311) of the removable commercial display kit box (305) may contain maintenance check visual indicators comprising a plurality of LED lights, with each LED light representing an operational status of a particular feature of the commercial display screen (300). In another embodiment of the invention, a rear surface of the removable commercial display kit box (305) may contain maintenance check visual indicators, instead of the bottom surface (311). In at least some instances, it may be desirable to place the maintenance check visual indicators at the bottom surface (311) of the removable commercial display kit box (305) for a quick and easy visual inspection by a maintenance technician, because a typical commercial display screen is mounted above the human eyelevel.

In some cases, the quick visual inspection alone may identify the problem for a commercial display screen and may not even require removing the removable commercial display kit box (305), let alone dismounting the entire commercial display screen unit (300). In other cases, the quick visual inspection of the maintenance check visual indicators may indicate what parts need to be replaced or repaired while the removable commercial display kit box (305) is still operationally attached to the corresponding base plate interface (303), and the maintenance technician may simply detach the removable commercial display kit box (305) to proceed with repair or replacement of parts contained in the removable commercial display kit box (305). Yet in some unusual cases, a malfunctioning part may be located outside of the removable commercial display kit box (305), thereby requiring the entire commercial display screen (300) to be dismounted from an installed position. In these unusual cases, screws, pins, or other attachment mechanisms used in conjunction with a first wall mount frame (307) and a second wall mount frame (315) to secure the commercial display screen (300) to the installed position may need to be unscrewed, removed, or disabled for a complete takedown of the commercial display screen (300).

Figure 4:
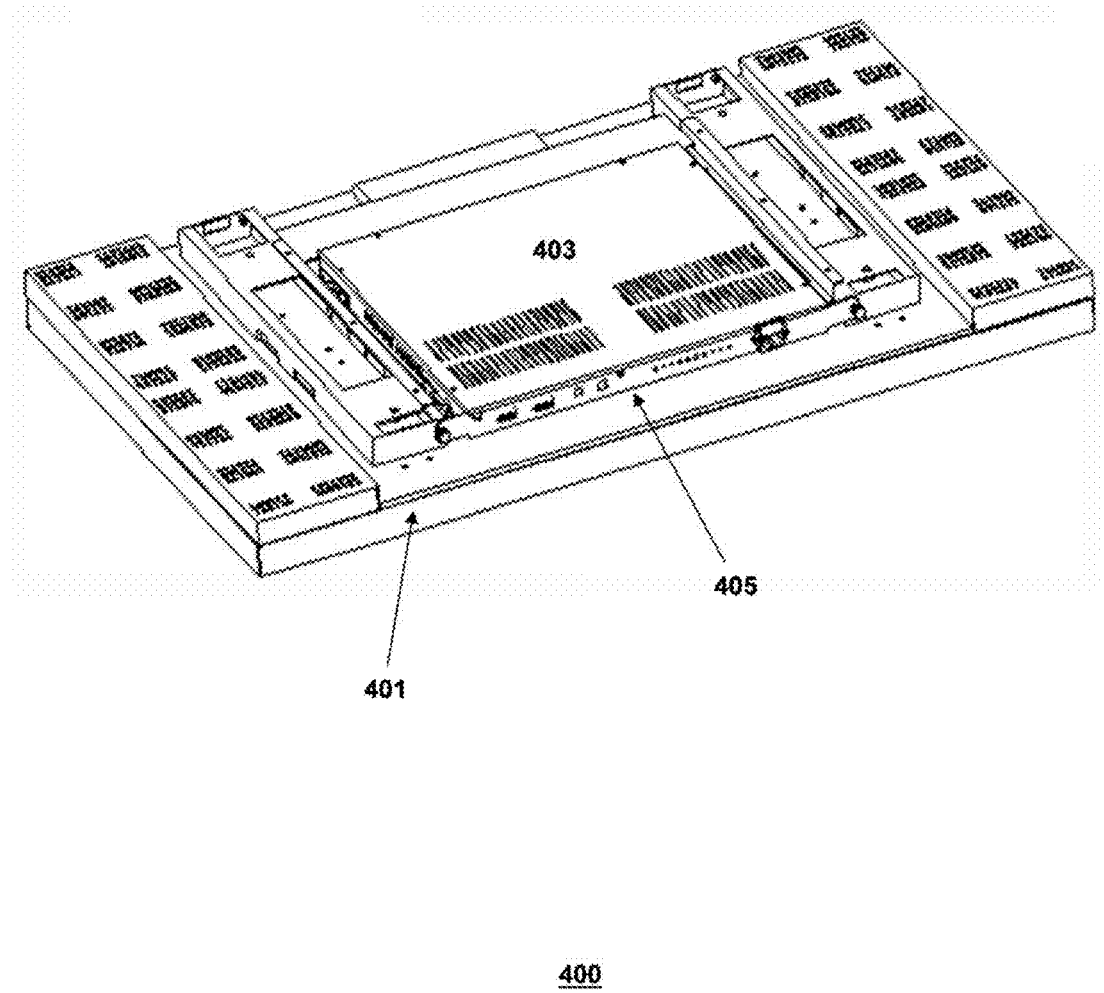
FIG. 4 shows a rear panel of a commercial display screen with a removable commercial display kit box docked into a corresponding interface, in accordance with an embodiment of the invention.

FIG. 4 shows a rear panel (401) of a commercial display screen (400) with a removable commercial display kit box (403) docked into a corresponding base plate interface, in accordance with an embodiment of the invention. As shown and described previously for FIG. 2 and FIG. 3, in a preferred embodiment of the invention, the removable commercial display kit box (403) contains at least some electronic components, which are prone to malfunction, wear-outs, and/or breakdowns during the operation of the commercial display screen (400). For example, in the preferred embodiment of the invention, the removable commercial display kit box (403) contains a power board which supplies and regulates power to various components of the commercial display screen (400), and an analog-to-digital converter board which can monitor power output levels to various components associated with the commercial display screen (400).

Furthermore, in a preferred embodiment of the invention, the commercial display kit box (403) may also include data ports (e.g. automatic-switching dual data ports, USB ports, and etc.), maintenance check visual indicators, a removable fuse inlet containing a replaceable electrical fuse, and one or more locking safety pins or screws to securely position the removable commercial display kit box (403) after its electrical contact pin-outs are aligned and docked into a corresponding base plate interface. As shown in FIG. 4, a docked position of the removable commercial display kit box (403) may involve securely holding the removable commercial display kit box (403) in place with the one or more locking safety pins or screws (e.g. 205, 213 of FIG. 2), which may be located at a bottom surface (405) of the removable commercial display kit box (403) in one embodiment of the invention.

Continuing with FIG. 4, in a preferred embodiment of the invention, it may be desirable to place maintenance check visual indicators at the bottom surface (405) of the removable commercial display kit box (403) for a quick and easy visual inspection by a maintenance technician, because a typical commercial display screen is mounted above the human eyelevel. Likewise, it may be desirable to place a removable fuse inlet containing a replaceable electrical fuse at the bottom surface (405) of the removable commercial display kit box (403) for a quick replacement of a blown electrical fuse by the maintenance technician.

Figure 5:
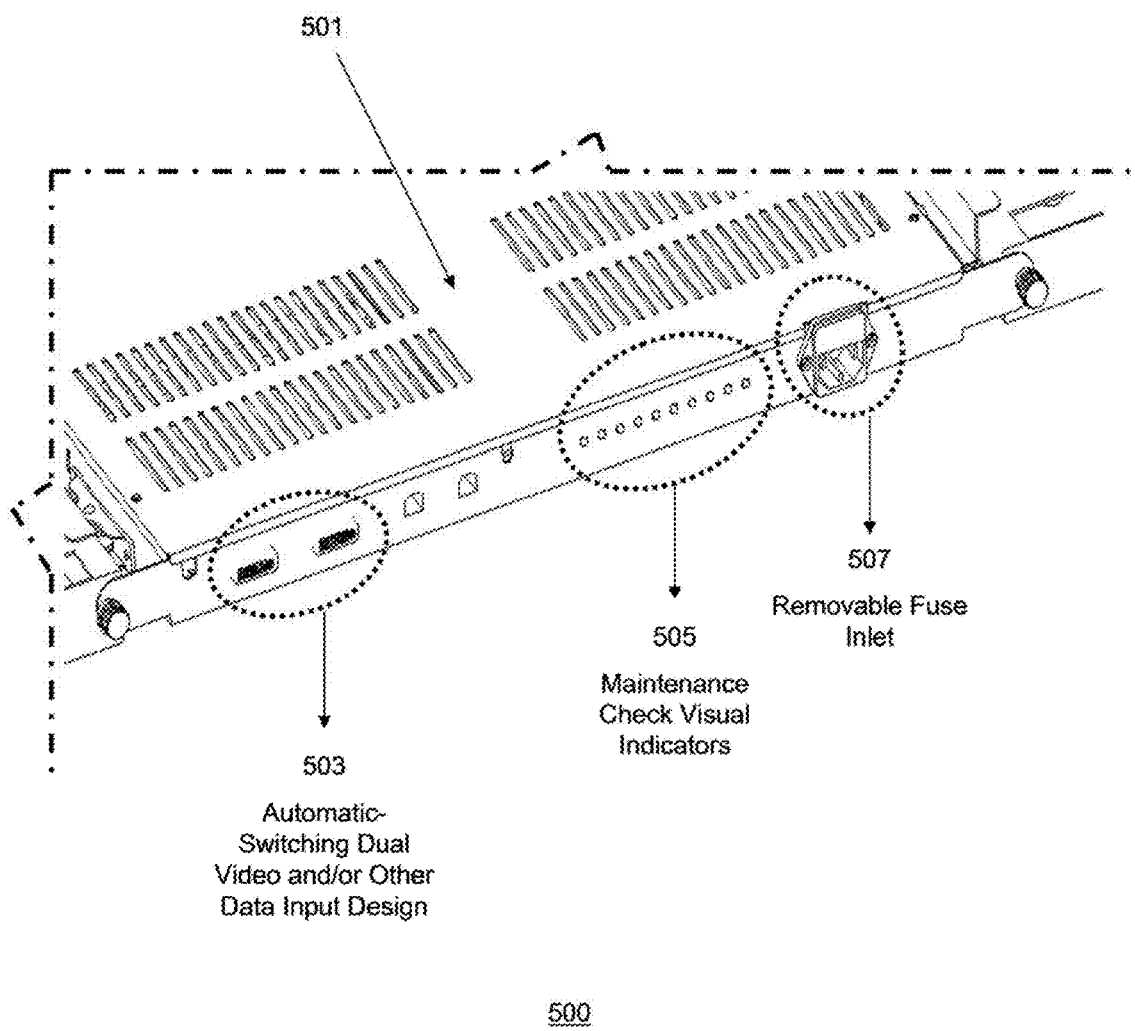
FIG. 5 shows a cutaway view of automatic-switching dual data ports, maintenance check visual indicators, and a removable fuse inlet on a surface of a removable commercial display kit box, in accordance with an embodiment of the invention.

FIG. 5 shows a cutaway view (500) of automatic-switching dual data ports (503), maintenance check visual indicators (505), and a removable fuse inlet (507) on a surface of a removable commercial display kit box (501), in accordance with an embodiment of the invention. In a preferred embodiment of the invention, the automatic-switching dual data ports (503), the maintenance check visual indicators (505), and/or the removable fuse inlet (507) are located on a bottom surface of the removable commercial display kit box (501), because a typical commercial display screen is mounted above the human eyelevel, and it may be convenient for a maintenance technician to inspect the maintenance check visual indicators (505) and/or the removable fuse inlet (507) on the bottom surface of the removable commercial display kit box (501), before determining the need to detach the removable commercial display kit box (501). In another embodiment of the invention, the automatic-switching dual data ports (503), the maintenance check visual indicators (505), and/or the removable fuse inlet (507) may be located on another surface of the removable commercial display kit box (501), preferably at a location easily visible for the maintenance technician.

In one embodiment of the invention, the automatic-switching dual data ports (503) are dual DVI ports configured to switch input signals from one DVI port to a second (i.e. "backup") DVI port, if the currently-sourced DVI port for multimedia display on a commercial display screen is no longer operating correctly (e.g. no signal, broken port, erroneous data transmission, and etc.). In another embodiment of the invention, the automatic-switching dual data ports (503) may be dual HDMI (high-definition multimedia interface) ports or another dual multimedia data ports, which provide a similar multimedia data port switchover function in case of a functional breakdown of a primary multimedia data port.

Continuing with FIG. 5, in one embodiment of the invention, the maintenance check visual indicators (505) comprise a plurality of LED lights, each of which representing an operational status of a particular feature of the commercial display screen. In another embodiment of the invention, the maintenance check visual indicators (505) comprise one or more LCD-based indicator displays, which show operational statuses of certain features of the commercial display screen. Furthermore, in one embodiment of the invention, the removable fuse inlet (507) contains a replaceable electrical fuse, which may be replaced by a maintenance technician if it is blown due to unstable electrical power supply conditions, or wear and tear. With an externally-accessible removable fuse inlet (i.e. 507) design as disclosed in various embodiments of the present invention, the maintenance technician can easily and readily replace a blown fuse, compared to a conventional design in which an electrical fuse is contained inside a fixed casing of a commercial display screen.

Figure 6A:
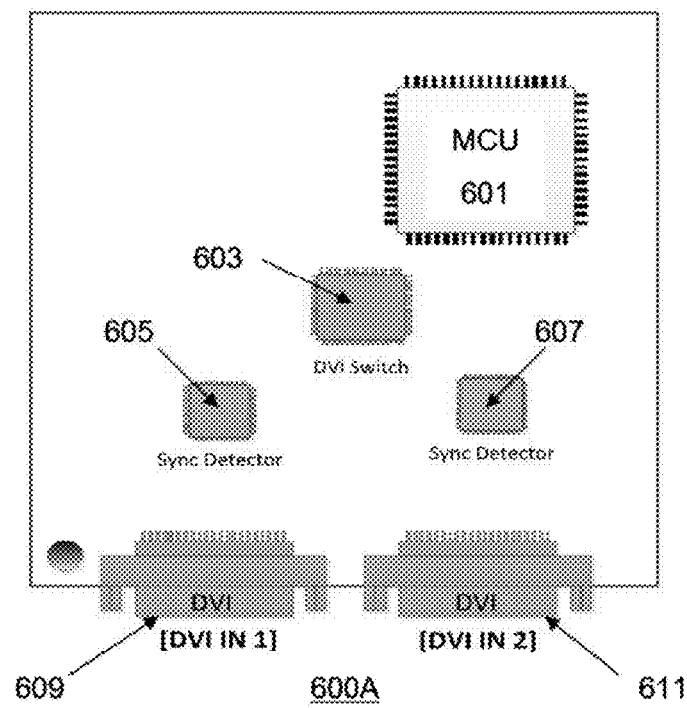
FIG. 6A shows a hardware chip diagram for automatic-switching dual data ports incorporated in a removable commercial display kit box, in accordance with an embodiment of the invention.

FIG. 6A shows a hardware chip diagram (600A) for automatic-switching dual data ports incorporated in a removable commercial display kit box, in accordance with an embodiment of the invention. In a preferred embodiment of the invention, the automatic-switching dual data ports comprise a multimedia data port switch (e.g. a DVI switch) (603) which is operatively connected to multimedia data ports (e.g. DVI ports) (609, 611) and a microcontroller unit (MCU) (601), and sync detectors (605, 607) which are operatively connected to the DVI ports (609, 611) and the MCU (601). Even though only two DVI ports (609, 611) and corresponding sync detectors (605, 607) are shown in FIG. 6A, it may be desirable to use more than two DVI ports or other multimedia data ports for the automatic switchover scheme of multimedia data signals in other embodiments of the invention.

In one embodiment of the invention as shown in FIG. 6A, each sync detector (605 or 607) is designed to detect multimedia signals through a corresponding DVI port (609 or 611), and periodically or continuously report back to the MCU (601). At some point during the operation of a commercial display screen, if the MCU (601) determines that it is desirable to switch the multimedia data input source from a first (i.e. currently-sourced) input port (e.g. 609) to a second (i.e. "backup") input port (e.g. 611) due to detected problems or errors associated with the currently-sourced input port (e.g. 609), then the MCU (601) can instruct the DVI switch (603) to switch the multimedia data input source to the second input port (e.g. 611). In one embodiment of the invention, the second input port (e.g. 611) may carry identical multimedia contents as a backup port to the first input port (e.g. 609). In another embodiment of the invention, the second input port (e.g. 611) may carry an alternative multimedia content, which is now displayed on the commercial display screen, instead of the other multimedia content from the first input port (e.g. 609). This novel automatic switchover design, as embodied by various embodiments of the invention, makes a commercial display screen more resilient to data reception failures or errors, which are common during an operation of the commercial display screen.

Figure 6B:
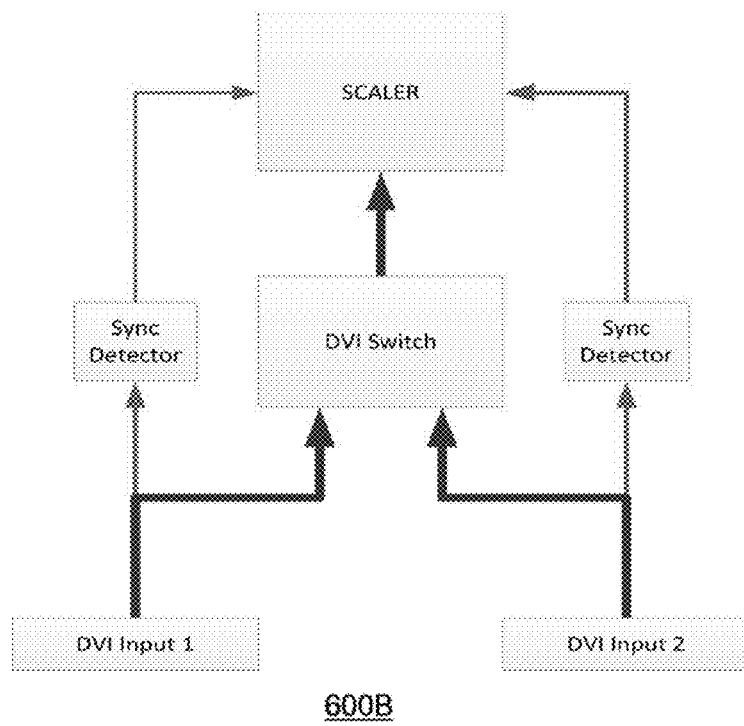
FIG. 6B shows a conceptual operational diagram for automatic-switching dual data ports incorporated in a removable commercial display kit box, in accordance with an embodiment of the invention.

FIG. 6B shows a conceptual operational diagram (600B) for automatic-switching dual data ports incorporated in a removable commercial display kit box, in accordance with an embodiment of the invention. As shown in the conceptual operational diagram (600B), in one embodiment of the invention, a CPU or an MCU associated with a commercial display screen operates an embedded software or a "scaler" (i.e. a logical block implemented in hardware and/or software, which looks for a particular signal from a sync detector) to check whether each sync detector operatively connected to a corresponding DVI input port is detecting normal signal receptions (e.g. a correct synchronization status) from the corresponding DVI input port. If one sync detector is reporting abnormal signal or no signal from its corresponding DVI input port, then, the CPU or the MCU executing the embedded software or the scaler may instruct a DVI switch to change the multimedia signal source from the currently-sourced DVI input port (e.g. DVI input 1) to another DVI input port (e.g. DVI input 2) that receives normal or correct multimedia signals.

In a preferred embodiments of the invention, two multimedia input ports may be used for this novel automatic switch-over design. In other embodiments of the invention, more than two multimedia input ports may be used for the automatic switch-over design, which may improve resilience of a commercial display screen from signal reception failures or errors even further.

Figure 7:
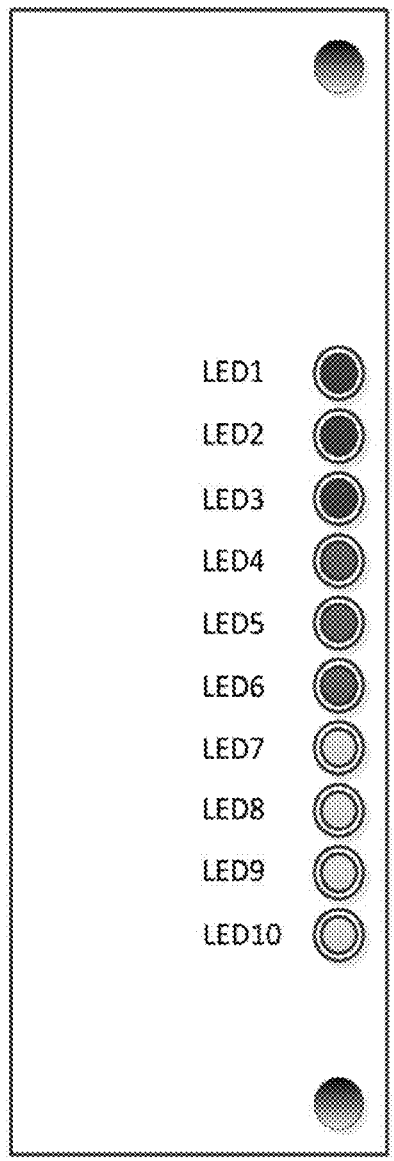
FIG. 7 shows an example of maintenance check visual indicators comprising a plurality of LED indicator lights on a surface of a removable commercial display kit box, in accordance with an embodiment of the invention.

FIG. 7 shows an example of maintenance check visual indicators (700) comprising a plurality of LED indicator lights (LED1, LED2, . . . , LED10) on a surface of a removable commercial display kit box, in accordance with an embodiment of the invention. In this embodiment of the invention as shown in FIG. 7, LED1 indicates a system monitoring status. For example, if LED1 is blinking, then the blinking light may indicate that the system monitoring is currently active. If LED1 is not blinking (i.e. either not flashing or simply off), then LED1 is indicating that the system monitoring is inactive. Furthermore, in this embodiment of the invention, LED2 indicates whether a backlighting lamp (i.e. a panel lamp) is currently active or not. For example, a "light on" mode on LED2 may suggest that the backlighting lamp is working correctly, whereas a flashing LED2 or a "light off" mode on LED2 may suggest that there is a problem with the backlighting lamp.

Continuing with FIG. 7, LED3 is operatively connected to a temperature sensor in a commercial display screen unit, and may indicate a current temperature level of the commercial display screen unit. For example, a green color on LED3 may indicate a normal temperature, while a red or a yellow color on LED3 may indicate an abnormal temperature condition. In addition, LED4, LED5, and LED6 are associated with power monitoring of direct current (DC) voltage in various components of the commercial display screen unit. In the embodiment of the invention as shown in FIG. 7, one or more analog-to-digital converters (A/D converters) may be used to sense power levels of certain power outputs (e.g. 24V, 12V, 5V), and indicate the current activity status of each power output to a corresponding LED light (e.g. LED4, LED5, or LED6). For example, if a 24V power output is currently active and normal, then the LED4 may indicate this by engaging in a "light on" mode. On the other hand, if an incorrect power level or no power output is detected from the 24V power output, then the LED4 may indicate this abnormality by engaging in a "light off" mode or a blinking mode. Likewise, a similar visual indicator scheme can be used for other power outputs such as 12V and 5V DC power outputs, which are represented by LED5 and LED6, respectively, in this particular embodiment of FIG. 7.

Furthermore, the maintenance check visual indicators (700) as shown in FIG. 7 can also include light indicators (i.e. LED7, LED8, LED9, LED10), which indicate current statuses of multimedia data ports. For example, if LED7 is engaged in a "light on" mode, it may indicate that DVI 1 is disconnected. Similarly, if LED8 is engaged in a "light on" mode, it may indicate that DVI 1 is not receiving any signals. Likewise, if LED 9 is engaged in a "light on" mode, it may indicate that DVI 2 is disconnected. Similarly, if LED10 is engaged in a "light on" mode, it may indicate that DVI 2 is not receiving any signals. While the maintenance check visual indicators (700) as shown in FIG. 7 is one possible embodiment of the invention, other embodiments of the invention may utilize different light indicator configurations and light on, off, blinking, and/or variable color schemes as desired by a particular design requirement.

Figure 8:
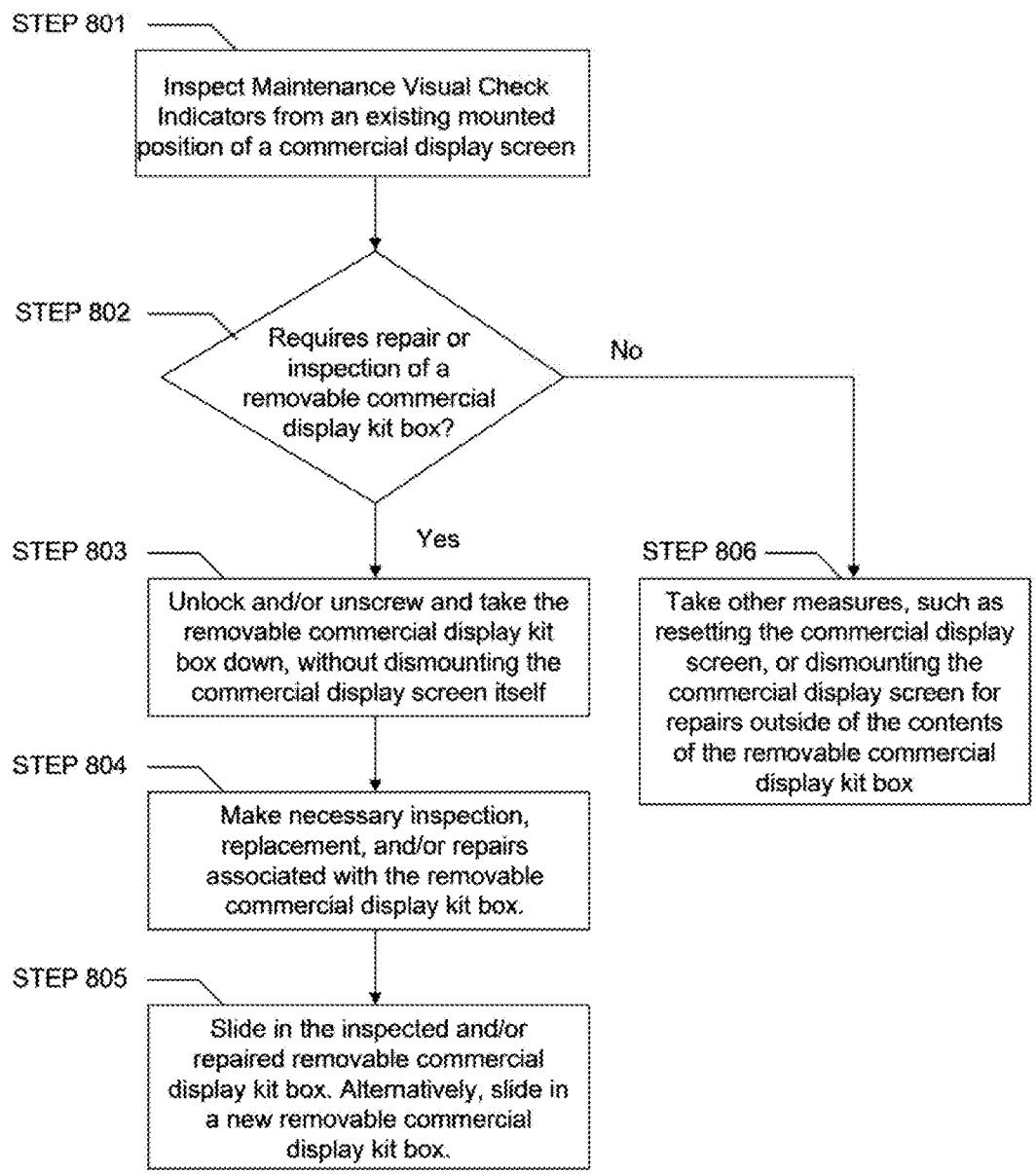
FIG. 8 shows a method flowchart for using a removable commercial display kit box for easy diagnosis, repair, and maintenance of a malfunctioning commercial display screen unit, in accordance with an embodiment of the invention.

FIG. 8 shows a method flowchart (800) for using a removable commercial display kit box for easy diagnosis, repair, and maintenance of a malfunctioning commercial display screen unit, in accordance with an embodiment of the invention. In the embodiment of the invention as shown in FIG. 8, a maintenance technician can first inspect maintenance visual check indicators from an existing mounted position of a commercial display screen, as shown in STEP 801. If the inspection of the maintenance visual check indicators does not suggest what needs to be repaired or inspected, and if a mere removal and hands-on inspection of a removable commercial display kit box is not likely to resolve a malfunction of the commercial display screen unit (i.e. STEP 802), then the maintenance technician can take other measures, such as resetting the commercial display screen unit, or dismounting the entire commercial display screen for repairs outside of the contents of the removable commercial display kit box, as shown in STEP 806.

On the other hand, if the inspection of the maintenance visual check indicators suggests that a repair or a hands-on inspection of the removable commercial display kit box (i.e. STEP 802) is required, then the maintenance technician can unlock and/or unscrew locking safety pins and detach the removable commercial display kit box from the rest of the commercial display screen unit, without dismounting the entire commercial display screen unit, as shown in STEP 803. Then, the maintenance technician can conduct necessary inspections, replacements, and/or repairs associated with the removable commercial display kit box, as shown in STEP 804. Once the necessary inspections, replacements, and/or repairs are completed, the removable commercial display kit box can be inserted back to its attached position in the commercial display screen unit, as shown in STEP 805. Alternatively, if the removable commercial display kit box was not repairable, or if the maintenance technician determined that it is better to use a new removable commercial display kit box, then the new removable commercial display kit box can be inserted into the attached position in the commercial display screen unit, instead of the old removable commercial display kit box, as also shown in STEP 805.

Various embodiments of the present invention may provide several advantages over conventional solutions. First, by utilizing the concept of a cartridge-style module in a commercial display screen for maintenance purposes, as embodied by a removable commercial display kit box in various embodiments of the present invention, maintenance and repair operations to the commercial display screen can be conducted more easily and in less time. In particular, by placing failure-prone electronic components such as a power board, an analog-to-digital converter board, and a replaceable electrical fuse (i.e. for protection against power surge and ESD) in a removable module (i.e. a removable commercial display kit box), various embodiments of the present invention enable a quick and easy inspection, repair, and maintenance of a commercial display screen, while avoiding a time-consuming and cumbersome dismounting of the entire commercial display screen unit from an installed position.

Furthermore, maintenance check visual indicators on a visible surface of the removable commercial display kit box provide an additional convenience of quick function or malfunction check via one or more indicator lights on the maintenance check visual indicators, even before deciding to detach the removable commercial display kit box from the corresponding base plate interface of a commercial display screen. Moreover, the automatic switch-over design of multimedia data ports, as optionally embodied in some embodiments of the invention, improves resilience for a continued operation of a commercial display screen by providing an automatic backup signal source in case of a signal reception failure or error on a primary multimedia data port.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An apparatus for easy diagnosis, repair, and maintenance of a commercial display screen, the apparatus comprising:
   a removable commercial display kit box with electrical contact pin-outs configured to be docked into a corresponding base plate interface, wherein the removable commercial display kit box contains automatic switching dual data ports that incorporate an embedded software executed on a microcontroller unit (MCU) to check whether a first sync detector connected to a first DVI input port, which is designated as a currently-sourced input port, is reporting a normal signal, an abnormal signal, or no-signal from the first DVI input port, wherein the abnormal signal or the no-signal for the first DVI input port invokes the embedded software to instruct a DVI switch to automatically change the currently-sourced input port to a second DVI input port connected to a second sync detector, if the second sync detector is reporting a normal backup signal from the second DVI input port;
   the corresponding base plate interface operatively connected to power inverters and low-voltage differential signaling (LVDS) system that are located outside of the removable commercial display kit box, wherein a docking between the corresponding base plate interface and the electrical contact pin-outs from the removable commercial display kit box provides docket electrical connections among the power inverters and the LVDS system, which are located outside of the removable commercial display kit box, and the automatic switching dual data ports inside the removable commercial display kit box; and
   one or more locking safety pins configured to provide a securely attached position between the removable commercial display kit box and the corresponding base plate interface.

2. The apparatus of claim 1, further comprising maintenance check visual indicators on a surface of the removable commercial display kit box, wherein each visual indicator shows a particular functional or operational status associated with the commercial display screen.

3. The apparatus of claim 2, wherein the maintenance check visual indicators comprise a plurality of light-emitting diodes (LED's) capable of blinking or changing colors.

4. The apparatus of claim 1, further comprising a precision tracking system which includes a first guide rail and a second guide rail attached to a base plate on a rear panel of the commercial display screen, wherein the first guide rail and the second guide rail are configured to guide side edges of the removable commercial display kit box to align and dock correctly with the corresponding base plate interface.

5. The apparatus of claim 1, further comprising a removable fuse inlet on a surface of the removable commercial display kit box, wherein the removable fuse inlet contains a replaceable electrical fuse which is replaceable externally, without opening the removable commercial display kit box.

6. The apparatus of claim 1, further comprising a first wall mount frame and a second wall mount frame, both of which are operatively attached to a base plate on a rear panel.

7. The apparatus of claim 3, wherein the plurality of light-emitting diodes (LED's) include a first LED for indicating a system monitoring activity status, a second LED for indicating a backlight lamp activity status, a third LED for current temperature of the commercial display screen, one or more LED's for power output levels within the commercial display screen, and one or more LED's for current connectivity and functional statuses of multimedia data input ports.

* * * * *